Feb. 10, 1931.  R. M. STAFFORD  1,791,516
CIRCUIT BREAKER FOR TANK LEVEL INDICATORS
Filed July 5, 1929  2 Sheets-Sheet 1
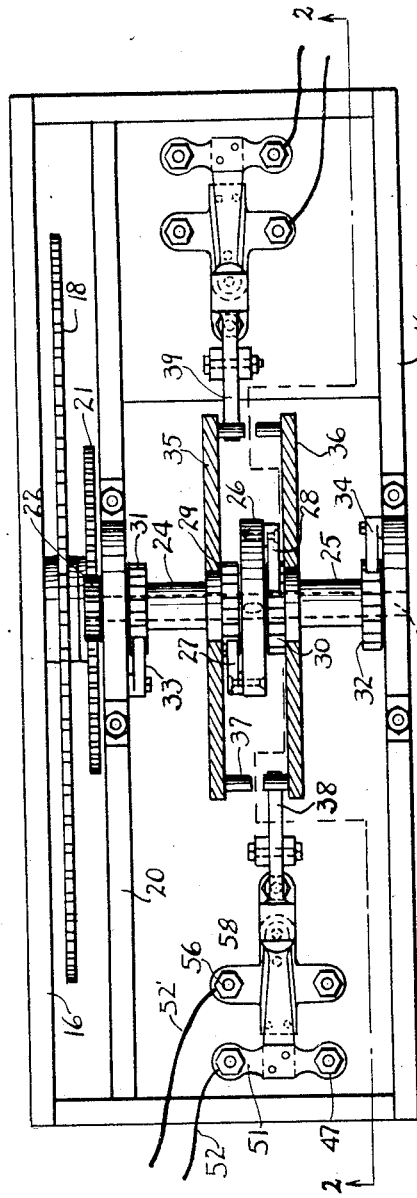
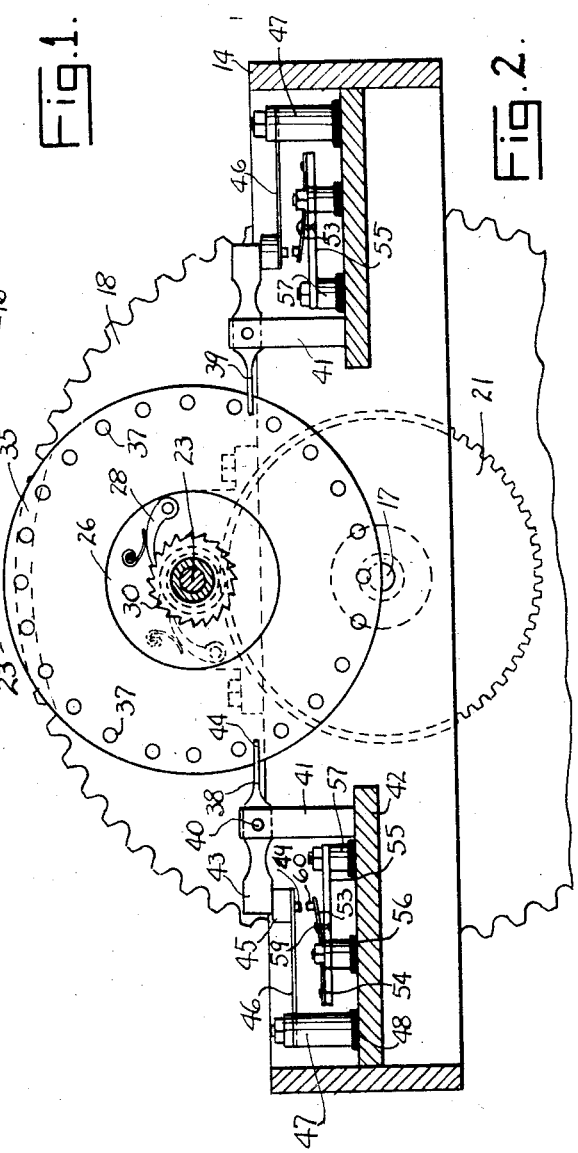
Roy M. Stafford  Inventor
By  Jesse R. Stone
Attorney Patented Feb. 10, 1931

1,791,516

UNITED STATES PATENT OFFICE

ROY M. STAFFORD, OF BEAUMONT, TEXAS, ASSIGNOR TO STAFFORD ELECTRIC GAUGE CORPORATION, A CORPORATION OF TEXAS

CIRCUIT BREAKER FOR TANK-LEVEL INDICATORS

Application filed July 5, 1929. Serial No. 375,944.

My invention relates to means for transmitting electrical impulses from one point to another responsive to changes in the liquid level in a tank or container.

One use which I contemplate for my device is in registering the liquid level in an oil tank in the storage of petroleum or its products. When the amount of oil in the tank is to be determined, it is now common to send a gauger into the field where the tank is located, and he must make measurements and calculate the oil present. This is dangerous to the workman and takes valuable time.

It is an object of my invention to provide an electrically operated device controlled by a float upon the liquid surface in the tank, to transmit impulses from the tank to be received upon an indicator at a distant point as in the office, and show at all times what is the level in the tank.

I desire to provide a simple and effective device operated through changes in the liquid level to make and break an electrical circuit which will serve to transmit the desired electrical impulses to the indicator.

The invention resides in the simple construction of the transmitter whereby the device is made accurate and at the same time of simple and positive operation.

The transmitter shown herein is an improvement upon the device shown in my co-pending application Serial No. 288,145, filed June 25, 1928, jointly with George A. Stafford.

Referring to the drawings herewith, Fig. 1 is a top plan view of a device embodying my invention, certain parts being in horizontal section for greater clearness.

Fig. 2 is a side view taken in section on the plane 2—2 of Fig. 1.

Figure 3:
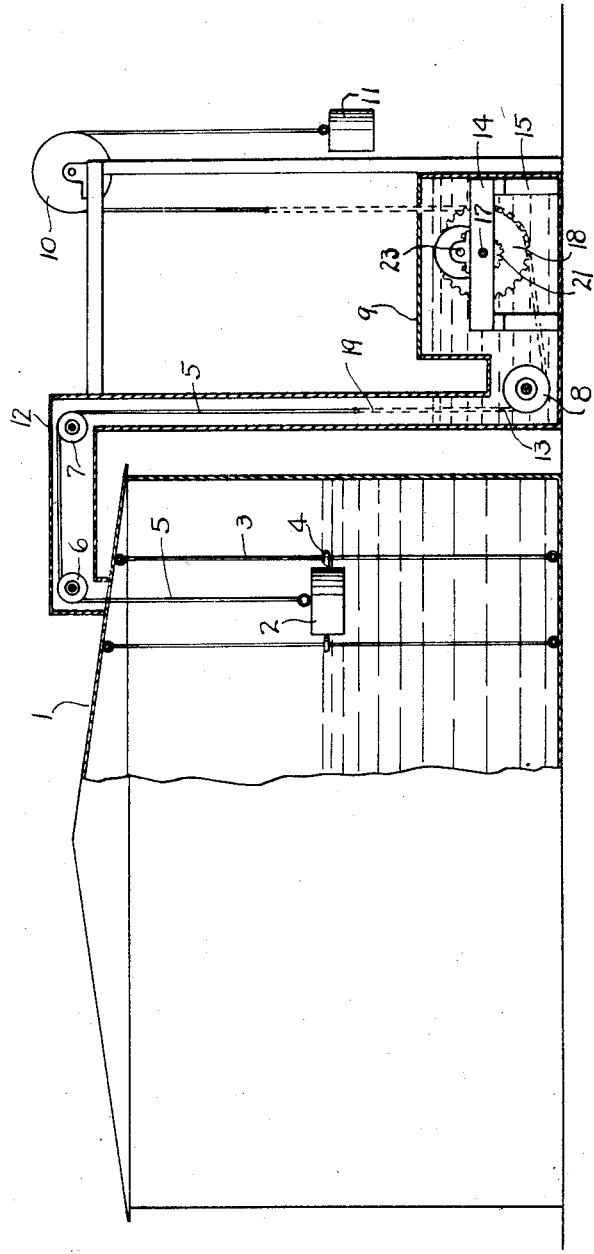
Fig. 3 is an assembly view partly in vertical section illustrating the manner in which my device is used.

Although it is to be understood that my device may be used in connection with liquid level indicators in general use, I have shown the device as applied to an oil tank in oil field operations. In Fig. 3 the tank is indicated at 1, and the float 2 is placed upon the upper surface of the liquid level in the tank. Said float may be of light material, such as cork, or may be of hollow sheet metal construction or any preferred type of float. I mount the same for accurate vertical sliding movement upon a pair of rods 3. The float 2 has lateral eyelets 4 secured thereto through which the rods may pass and hold the said float against vibration or lateral sway. A line 5 is secured to the upper end of the float and is passed over a series of pulleys 6, 7 and 8 into a box 9 for the transmitter. From there it is run upwardly over a pulley 10 and has a weight 11 on the lower end, which, as will be obvious, tends to hold the line taut.

I have housed the line 5 in a tube 12 so that it may be protected and so that gas from the tank may not escape or foreign material obtain access either to the tank or the box 9. The housing is connected at one end with the upper wall of the tank and at the other end with the chamber 13 extending from one side of the box 9.

The box 9 serves as a case or housing for the transmitter mechanism which forms the subject matter of this invention. The device is mounted upon a frame 14, spaced upwardly upon supports 15. It is set within the box or housing 9 and is adapted to be submerged in a liquid which is a good insulator or non-conductor of the electricity, said liquid acting to prevent sparks from the contact members.

With reference particularly to Figs. 1 and 2, the frame 14 for the device includes two longitudinal side supports 16 upon which is secured a shaft 17 supported upon the side member 16 and supplementary support 20 adjacent thereto. Said shaft serves as a mounting for a sprocket wheel 18 thereon, but instead of the wheel a pulley may be used, if desired. I have shown a sprocket wheel as forming a connection between the line 5 and the device to be operated thereby, which will prevent slipping of the line relative to the wheel. As will be seen from Fig. 3, the line has a sprocket chain 19 secured therein to run about the wheel 18 and transmit motion thereto.

The wheel 18 is secured to the shaft 17, which has thereon a smaller gear wheel 21 operated by the larger wheel. Said gear wheel 21 has engagement with a similar gear wheel 22 mounted upon a shaft 23 supported at a higher level than the shaft 17 and having thereon the operative devices for controlling the circuit breaker.

With reference to Fig. 1, the shaft 23 is shown in dotted lines. The gear 22 is on one end thereof between the supports 16 and 20. Mounted upon the shaft are two sleeves 24 and 25, which are rotatable on the shaft. Between the two sleeves 24 and 25 is a disc or plate 26 keyed to the shaft and rotatable therewith. Mounted on the disc 26, on each side thereof, are the pawls 27 and 28. On the end of sleeve 24, adjacent the disc 26, is a ratchet wheel 29, which has its teeth arranged to engage with the pawl 27 so that when the disc 26 is rotated in one direction it will engage the ratchet 29 and transmit rotation to said sprocket wheel and to the sleeve 24. The pawl 28 is adapted to engage with a similar wheel 30 upon the sleeve 25 and transmit rotation from the disc 26 to the sleeve 25 on the rotation of said disc in a direction opposite to that which transmits rotation to the opposite ratchet wheel. It will thus be seen that the rotation of the shaft in one direction will serve to drive the sleeve 24 but the rotation in the opposite direction will rotate the sleeve 25.

To prevent rotation in the wrong direction of the sleeves 24 and 25, I provide a ratchet wheel 31 on the sleeve 24 and a similar ratchet wheel 32 on the sleeve 25. A pawl 33 engages the ratchet wheel 31 to prevent its rotation in the wrong direction, i. e., in the direction opposite to the direction in which it is driven by the disc 26. A pawl 34 engaging the ratchet wheel 32 prevents rotation of the sleeve 25 in the wrong direction.

Each of the sleeves 24 and 25 are provided with plates 35 and 36, respectively, said plates being of circular shape and secured non-rotatably to the sleeve so that when the sleeve is driven the plate attached thereto will also be rotated. Each of the plates 35 and 36 is provided with inwardly projecting pins 37. Said pins may be spaced apart so that there is no likelihood of their contacting with each other during rotation.

The pins 37 on the disc 36 are adapted to engage with a lever arm 38, while the pins 37 on the disc 35 are adapted to engage with a similar lever arm 39. Each of the lever arms are similarly mounted and operate in the same way to close an electric circuit and but one of them needs to be described. The lever 38 is mounted between its ends upon a pivot 40 at the upper end of a post 41 mounted on a base 42. At the end of the lever 38, opposite the pin engaging point 44, is a hammer 43. Said hammer is adapted to strike a block 45, mounted upon the outer end of a spring arm 46, which is supported at its opposite end upon a post 47 secured to, but insulated from the base 42 by an insulating washer 48. On the lower side of the spring arm 46, below the block 45 is a contact point 49. As will be seen from Fig. 1, the spring arm 46 is midway between the two posts 47 and is connected with said posts by lateral arms 51. One of said posts may be connected by means of a conducting wire 52 to some indicator not shown.

Beneath the spring arm 45 is a co-operating spring arm 53. Said arm is mounted at one end 54 to a plate 55. Said plate is supported upon posts 56 and 57 and insulated from the base 42. At the end adjacent the posts 56 the plate has branching arms 58 supported upon the posts 56 and one of them may be connected by means of a conductor 52' with the indicator previously referred to. The spring arm 53 is normally bent upward away from the plate 55. Its upward movement is limited by a short bolt or rivet 59 so that the contact point 60 thereon is normally spaced slightly below the contact point 49.

As will be seen from Fig. 2, the pins 37 thereon, which serve to engage with the lever arms 38, are spaced uniformly apart and at a suitable distance from each other. When the level of liquid in the tank is varied the plates 35 and 36 will be rotated in the manner previously described. If the fluid rises, due to an increase in the amount of liquid in the tank, the wheel 18 will be moved in an obvious manner to rotate the shaft in a direction to rotate the sleeve 25. The rotation of the said sleeve will cause one of the pins 37 to contact with the arm 38 of the lever and as the pin moves past the point 44 on the lever, the hammer 43 on the opposite end will drop by gravity, striking a blow upon the block 45 and depressing the contact point 49 against the contact point 60, which will also be depressed. The spring arm 46 will tend to recoil and carry the hammer 43 back to its original position and break the contacts between the points 49 and 60, but it will be noted that the contact points 49 and 60 will be together momentarily while the point 60 is being depressed, and on the recoil of the point 60 following the upward movement of the block.

This will be sufficient to close the circuit between the conductors 52 and 52', thus sending an electrical impulse to the proper magnet on the indicator, to move the indicator in the proper direction to show an increase of a certain amount in the volume of liquid in the tank. It will be obvious that a movement of the fluid downwardly to indicate a decrease of liquid in the tank will act to move the wheel 18 and the disc 35 so as to operate the lever arm 39 upon the opposite contact member and transmit an impulse to a different magnet in the indicator so as to show a decrease in the volume of liquid in the tank.

The advantages of my improved construction of transmitter is that it is of simple construction and may not easily get out of order. It will serve to transmit accurately impulses from the transmitter to the indicator so that no failure of the device in use will occur. The advantage lies largely in the simplicity and effectiveness of the transmitter.

What I claim as new is:

1. A device of the character described comprising a wheel, float controlled means to rotate said wheel, a shaft connected for rotation by said wheel, a disc fixed on said shaft, plates rotatable on said shaft and adapted to be driven from said disc, one in one direction and the other in the opposite direction, pins on said plates, a lever adjacent each plate, a hammer on each of said levers adapted to be raised and dropped by the contact of said pins therewith, a pair of spring arms beneath said hammer adapted to be brought in contact by a blow from said hammer and electric conductors connected with said arms.

2. A device of the character described comprising a wheel, float controlled means to rotate said wheel, a shaft connected for rotation by said wheel, a disc fixed on said shaft, plates rotatable on said shaft and adapted to be driven from said disc, one in one direction and the other in the opposite direction, pins on said plates, a hammer operated by contact with said pins therewith, a spring arm below said hammer, a contact point on said arms and a second contact point below the first named one, said points being brought together by a blow from said hammer.

3. In combination, a shaft, a wheel, thereon rotatable in response to the movement of a float, a disc on said shaft, a pair of plates on said shaft each rotatable in a different direction by said disc, a lever having a hammer on one end thereof, means on said plate to engage said lever when said plate is rotated and cause said hammer to drop, and a pair of contact points adapted to be closed by the dropping of said hammer.

4. In combination, a shaft, a wheel thereon rotatable in response to the movement of a float, a disc on said shaft, a plate on said shaft rotatable in one direction by said disc, a lever having a hammer on one end thereof, means on said plate to engage the end of said lever away from said hammer when said plate is rotated and cause said hammer to drop, a pair of super-posed spring arms below said hammer, contact points on said arms, and an electric circuit connected with said spring arms adapted to be closed by the dropping of said hammer.

5. In a circuit maker of the character described, a float, a shaft rotatable through movement of said float, a disc on said shaft, a pair of plates adjacent said disc each rotatable in a different direction by said disc, pins on said plates, a pair of super-posed spring arms, contact points on said arms, and means operable through the pins on said plate to strike a blow upon said spring arms for the purpose described.

6. A device of the character described comprising a wheel, float controlled means to rotate said wheel, a shaft connected for rotation by said wheel, a disc fixed on said shaft, plates rotatable on said shaft and adapted to be driven from said disc, one in one direction and the other in the opposite direction, pins on said plates, levers operated by contact with said pins to strike a blow, and a pair of electric contact points adapted to be closed together by a blow from said lever.

In testimony whereof I hereunto affix my signature this 28th day of June, A. D. 1929.

ROY M. STAFFORD.